UNITED STATES PATENT OFFICE.

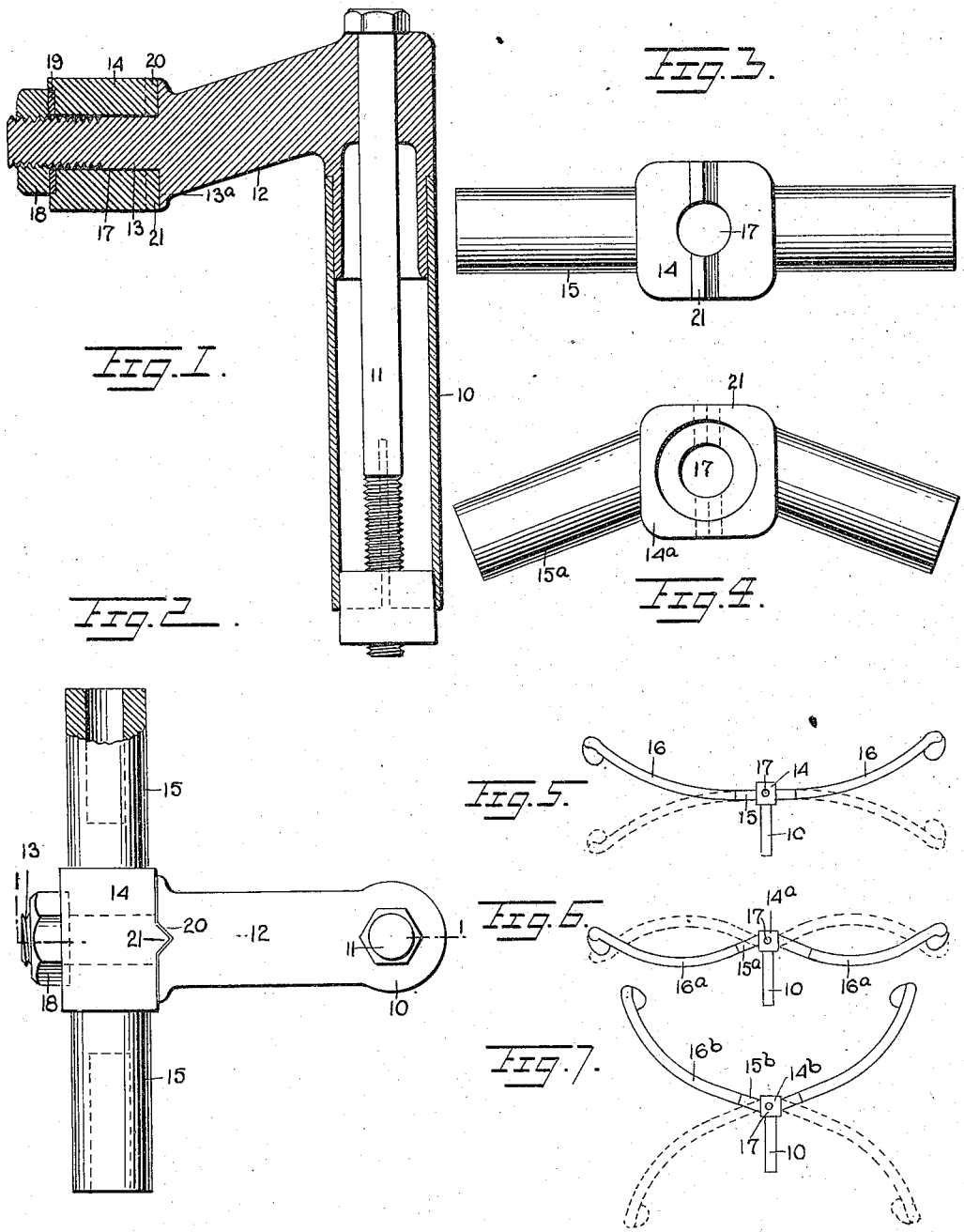

ERNEST JOSEPH CORTINES, OF DALLAS, TEXAS.

HANDLE-BAR.

1,140,119.   Specification of Letters Patent.   Patented May 18, 1915.

Application filed December 24, 1914. Serial No. 878,903.

*To all whom it may concern:*

Be it known that I, ERNEST J. CORTINES, a citizen of the United States, and a resident of Dallas, in the county of Dallas and State of Texas, have invented a new and Improved Handle-Bar, of which the following is a full, clear, and exact description.

My invention relates more particularly to handle bars for bicycles adjustable on the screw stem, so as to dispose the handles in different positions.

These handle bars have been made rigid with each other, and also have been made adjustable relatively to each other, adjustable connection being usually effected in the type of handle to which the invention relates, between the handle bar forging and a lateral arm on the stem.

The connecting means between the handle bar forging and the stem in a certain type includes an annular series of radial mating teeth on the stem arm and bar. The large number of teeth has been relied upon to hold the handle bar in adjusted position, and in practice a slight loosening of the nut which holds the parts together results in a loosening of the handle bar, which is attended with considerable danger when under high speed. In the case of a handle bar with arms adjustable to vary their angular position relatively to each other, care and skill are required to secure each arm at the same angle.

My invention contemplates a handle bar in which the arms are in rigid relation to each other, and to the forging, and the adjustment provided for is the bodily reversal of the handle bar on the stem arm, so that the handle arms may curve upwardly or downwardly. To secure the handle bar to the arm of the stem, instead of employing annular series of shallow radial teeth, I provide mating rib and groove members on a single line, positioned to inter-engage in either of the positions of the handle bar, so that only the correct adjustment can be made, and the rib and groove connection is of a depth to hold the handle bar against a turning movement, even though the binding nut should become loose to a slight degree.

The invention will be particularly explained in the specific description following.

Reference is had to the accompanying drawings forming part of this specification, in which similar characters of reference indicate corresponding parts in all the views, and in which:

Figure 1 is a vertical section of the handle bar and stem; Fig. 2 is a plan view of the handle bar forging and stem, the handle bar arms being omitted; Fig. 3 is a rear view of the handle bar forging; Fig. 4 is a front view of the handle bar forging showing a slight modification; Fig. 5 is a front view on a reduced scale of the handle bar and its forging, and the stem with the forging in the form shown in Figs. 2 and 3; Fig. 6 is a view similar to Fig. 5, but showing the handle bar forging of the type shown in Fig. 4; and Fig. 7 is a view similar to Fig. 6, showing further slight modification.

In carrying out my invention, in accordance with the illustrated example, the stem 10 may be, for the most part, of known form, secured by the usual stem bolt 11, and having the laterally extending arm 12 to carry the handle bar. The outer end 13 of the arm 12 is reduced to receive the handle bar forging 14, there being a shoulder 13$^a$ at the base of said reduced end.

The forging 14 has integral sockets 15 to receive the oppositely extending arms 16 in the usual manner. The forging 14 has a bore 17 to fit over the reduced end 13, and said reduced end is threaded to receive the usual nut 18 and washer 19, which in practice is a spring washer.

Instead of the usual radial series of mating teeth on the shoulder 13$^a$ and on the rear face of the forging 14, to interlock for holding the handle bar in adjusted position, I form in the said shoulder upper and lower groove members 20, which aline with each other above and below the reduced end 13. Similarly, on the rear face of the forging 14 I form vertical rib elements 21, the ribs and grooves being V-shaped, and being of a depth that any slight loosening of the nut 18 will not serve to disengage the rib stem arm, the handle bar may be readily thus producing the interengaging rib and groove formations along a single line extending at diametrically opposite sides of the forging and the reduced end of the stem arm, the handle bar may be readily and quickly reversed from the position shown in full lines in Fig. 5, to the dotted line position, and in both instances the single line of interlocking positively determines the adjustment of the handle bar, so that the turning home of the nut 18 serves to firmly hold the handle bar in position.

In the form shown in Fig. 3 the sockets 15 extend in a horizontal line, while in the form shown in Figs. 4 and 6 the handle bar forging 14ª is formed with sockets 15ª at an inclination to the horizontal, so that handle bar arms 16ª (Fig. 6) will be correspondingly positioned. The forging 14ª and the handle bar arm may be reversed from the full line position to that shown in dotted lines Fig. 6. In Fig. 6 also the arms 16ª are shown as having a greater curve than the arms 16. In the form shown in Fig. 7 the handle bar forging 14ᵇ has sockets 15ᵇ inclined somewhat similarly to the sockets 15ª, and I have shown in this figure handles 16ᵇ varied in curvature from the arms in the other figures. The reversal of the forging 14ᵇ serves to dispose the handle bar from the position shown in full lines to that indicated in dotted lines.

Having thus described my invention, what I claim as new and desire to secure by Letters Patent; is:

In a device of the character described, a handle bar, a securing stem therefor, and means to confine the handle bar to one of the two positions on the stem and rigidly secure the same, said stem having an arm terminating in a reduced threaded end and presenting a shoulder at the base of the threaded end, the said handle bar having a central rigid forging formed with a transverse bore fitting the threaded end of the stem arm, and rigid handle arms integral with the forging at opposite sides, said forging having on its rear face, on a single line, V-shaped rib elements disposed in alinement with each other at diametrically opposite sides of the bar, the shoulder of the stem having thereon corresponding V-shaped groove members disposed in alinement at diametrically opposite sides of the threaded end of the said stem arm; together with means to clamp the handle bar on the stem arm with the rib elements engaged in the groove members.

In testimony whereof I have signed my name to this specification in the presence of two subscribing witnesses.

ERNEST JOSEPH CORTINES.

Witnesses:
WALTER L. SYKES,
J. S. TAYLOE, Jr.

Copies of this patent may be obtained for five cents each, by addressing the "Commissioner of Patents, Washington, D. C."